United States Patent
Olson et al.

(10) Patent No.: US 7,793,010 B2
(45) Date of Patent: Sep. 7, 2010

(54) BUS SYSTEM WITH MULTIPLE MODES OF OPERATION

(75) Inventors: David M. Olson, The Woodlands, TX (US); Gary Piccirillo, Cypress, TX (US); Peter B. Chon, Houston, TX (US)

(73) Assignee: LSI Corporation, Milpitas, CA (US)

( * ) Notice: Subject to any disclaimer, the term of this patent is extended or adjusted under 35 U.S.C. 154(b) by 345 days.

(21) Appl. No.: 11/285,243

(22) Filed: Nov. 22, 2005

(65) Prior Publication Data

US 2007/0130407 A1 Jun. 7, 2007

(51) Int. Cl.
*G06F 3/00* (2006.01)
*G06F 13/36* (2006.01)

(52) U.S. Cl. .................................. 710/14; 710/306
(58) Field of Classification Search .............. 710/14, 710/306; 713/323
See application file for complete search history.

(56) References Cited

U.S. PATENT DOCUMENTS

| | | | | |
|---|---|---|---|---|
| 7,136,953 B1* | 11/2006 | Bisson et al. | ............... | 710/307 |
| 2004/0019726 A1* | 1/2004 | Kelley et al. | ............... | 710/305 |
| 2004/0019729 A1* | 1/2004 | Kelley et al. | ............... | 710/306 |
| 2004/0039986 A1* | 2/2004 | Solomon et al. | ............ | 714/799 |
| 2004/0128576 A1* | 7/2004 | Gutman et al. | ............. | 713/323 |
| 2005/0270988 A1* | 12/2005 | DeHaemer | ................. | 370/254 |

* cited by examiner

*Primary Examiner*—Henry W. H. Tsai
*Assistant Examiner*—Titus Wong
(74) *Attorney, Agent, or Firm*—Yee & Associates, P.C.

(57) ABSTRACT

An apparatus and a computer-implemented method for processing data in a bus system component. The bus system component is configured to operate in one of an endpoint mode and a root complex mode. Responsive to configuring the bus system component to operate in endpoint mode, the data is processed through the bus system component according to an endpoint process. Responsive to configuring the bus system component to operate in root complex mode, the data is transferred through the bus system component according to a root complex mode. In an illustrative example, the bus system component is a peripheral control interconnect express component.

16 Claims, 6 Drawing Sheets

BUS SYSTEM WITH MULTIPLE MODES OF OPERATION

BACKGROUND OF THE INVENTION

1. Technical Field

The present invention relates generally to an improved data processing system and in particular to the transmission of data in a bus device. Still more particularly, the present invention relates to an apparatus and a computer implemented method for a PCI Express component that operates in multiple modes.

2. Description of the Related Art

In data processing systems such as computers, a bus system is used to allow various parts of a computer to communicate with each other. For example, a bus system may connect a peripheral device to a central processing unit. A familiar example of this type of bus system is a universal serial bus (USB) system which allows a device, such as a mouse, to communicate with a mouse controller, which in turn is controlled by the computer's central processing unit.

One type of a known bus system is a peripheral control interconnect bus system, or a PCI bus system. A PCI bus system may be used to allow a computer component, such as a video card, to communicate with the video card controller and, in turn, with the computer's central processing unit. A modern version of the PCI bus system, known as peripheral control interconnect express (PCI Express) has recently been developed. The PCI Express bus system is a more advanced version of the previous PCI bus system, in the sense that a PCI Express bus system may rout data more quickly than a PCI bus system.

In the PCI Express bus system, the target to which data is routed is a PCI Express component, such as a device controller. In the previous paragraph, the video card controller would be a PCI Express component. The PCI Express component is configured for operation by software, such as a device driver. In addition, the PCI Express bus system includes a root complex component that performs the processing and logic required to allow a processor to communicate with the PCI Express component. In the case of a video card, the root complex component is the bridge between an express bus that connects to the video card controller and the host central processing unit. Continuing the above example, the video card controller is configured for operation by a device driver running on the host central processing unit through the topology of the root complex of the PCI Express bus system.

In an exemplary hierarchy, one root complex exists in a PCI Express hierarchy. In this case, the root complex is the only hierarchy agent that can run the PCI Express configuration and input/output cycle types required to configure the other devices on the hierarchy to achieve a functional bus topography. In addition to hierarchy configuration, the root complex has other unique features in the topology regarding PCI Express message handling, bus/device number assignment, and PCI Express bus initialization and training behavior.

Thus, in many types of data processing systems, a root complex connects the processor to the PCI Express component directly via a PCI Express bus. However, in some types of data processing systems, such as where the processor is logically or physically separated from the controlled device, an intermediate interface is required. In this case, two PCI Express bus systems are used, one for each data processing system. A first root complex is used to connect the CPU to an intermediate interface that connects to the other data processing system. A second root complex is used to connect a controlled device to the intermediate interface.

A problem associated with the two different data processing system configurations described above is that at least two application specific integrated circuits must be developed for each controlled device, even though the controlled devices are the same in each configuration. The problem arises because a root complex PCI Express component is used when the CPU and the controlled device are physically or logically separate, whereas a standard endpoint PCI Express component is used for devices within the same server enclosure. The PCI Express specification standards have different protocols for processing data through each type of PCI Express component. For this reason, a different application specific integrated circuit would normally have to be developed for each of the two different data processing system configurations, even though the controlled devices are the same in each configuration. However, the application specific integrated circuits used for both modes of operation share common features, such as the ability to transfer data to and from the controlled device.

SUMMARY OF THE INVENTION

The present invention provides an apparatus, method, and computer program product for processing data in a bus system component. The bus system component is configured to operate in one of an endpoint mode and a root complex mode. Responsive to configuring the bus system component to operate in endpoint mode, the data is processed through the bus system component according to an endpoint process. Responsive to configuring the bus system component to operate in root complex mode, the data is transferred through the bus system component according to a root complex mode. In an illustrative example, the bus system component is a peripheral control interconnect express component.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative example when read in conjunction with the accompanying drawings, wherein:

DETAILED DESCRIPTION

The description of the preferred embodiment of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention the practical application to enable others of ordinary skill in the art to understand the invention for various embodiments with various modifications as are suited to the particular use contemplated.

Figure 1:
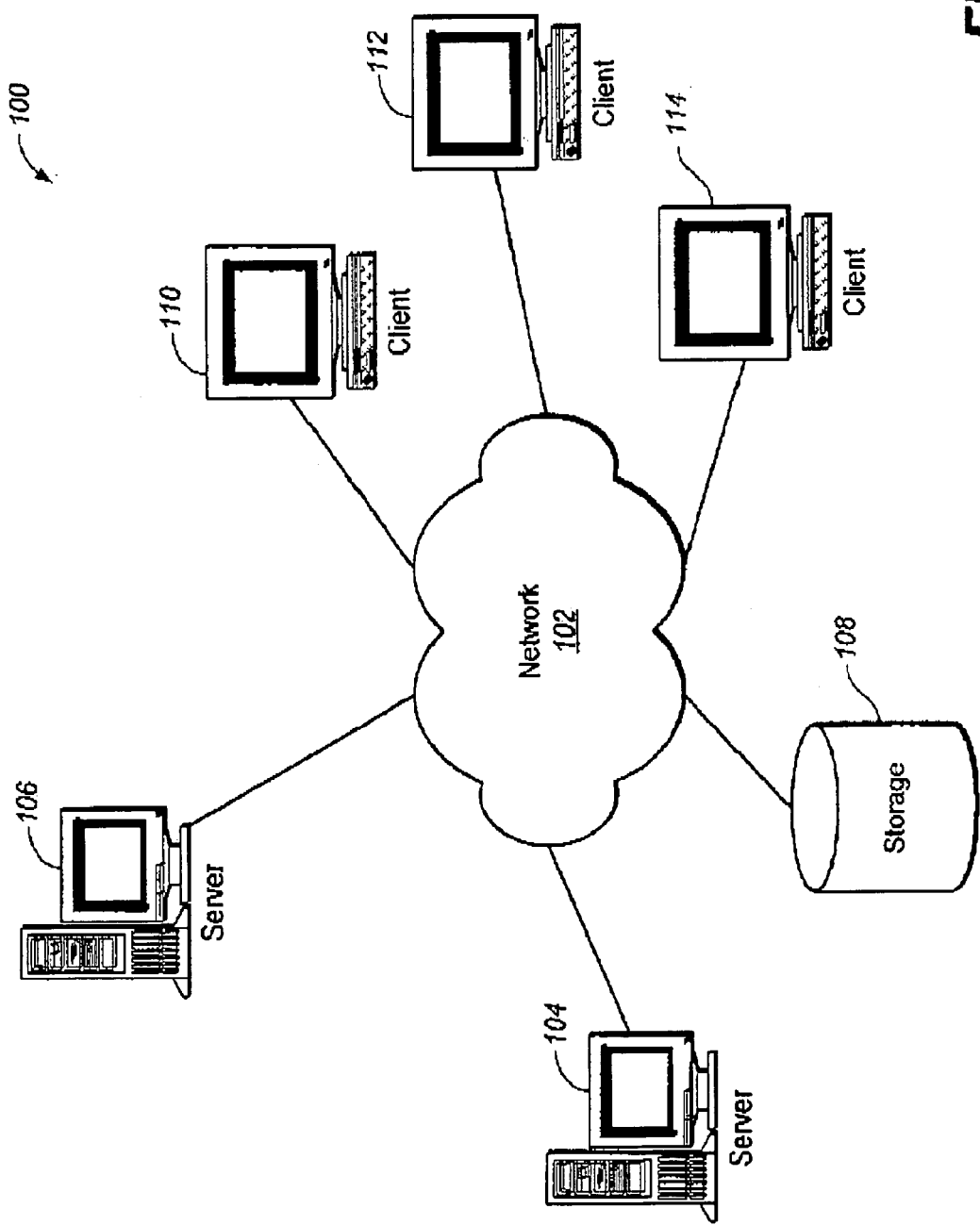
FIG. 1 is a block diagram of a network of data processing systems in which aspects of the present invention may be implemented.
Figure 2:
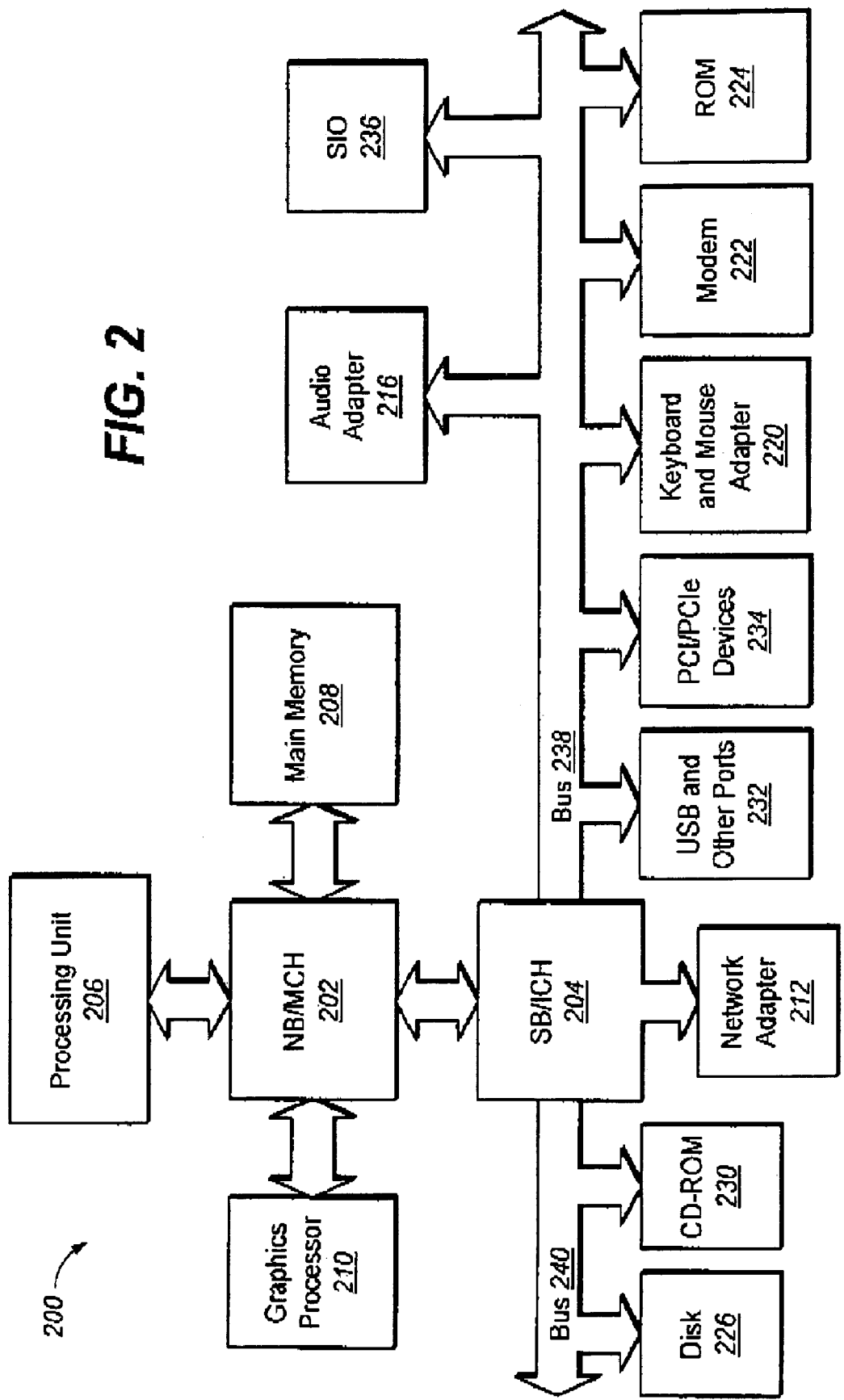
FIG. 2 is a block diagram of a data processing system in which aspects of the present invention may be implemented.

FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers or data processing systems in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (MCH) 202 and south bridge and input/output (I/O) controller hub (ICH) 204. Processing unit 206, main memory 208, and graphics processor 210 are connected to north bridge and memory controller hub 202. Graphics processor 210 may be connected to north bridge and memory controller hub 202 through a bus interface such as an accelerated graphics port (AGP) or PCI Express.

In the depicted example, local area network (LAN) adapter 212 connects to south bridge and I/O controller hub 204. Audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCI Express devices 234 connect to south bridge and I/O controller hub 204 through bus 238 and bus 240. PCI/PCI Express devices may include, for example, Ethernet adapters, add-in cards and PC cards for notebook computers.

Hard disk drive 226 and CD-ROM drive 230 connect to south bridge and I/O controller hub 204 through bus 240. Hard disk drive 226 and CD-ROM drive 230 may use, for example, an integrated drive electronics (IDE) or serial advanced technology attachment (SATA) interface. Super I/O (SIO) device 236 may be connected to south bridge and I/O controller hub 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java programs or applications executing on data processing system 200 (Java is a trademark of Sun Microsystems, Inc. in the United States, other countries, or both).

Data processing system 200 may be a server. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as hard disk drive 226, and may be loaded into main memory 208 for execution by processing unit 206. The processes for embodiments of the present invention are performed by processing unit 206 using computer usable program code, which may be located in a memory such as, for example, main memory 208, read only memory 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course the bus system may be implemented using any type of communications fabric or architecture that provides for transmission of data between different components or devices attached to the fabric or architecture. A communications unit may include one or more devices used to transmit and receive data, such as modem 222 or network adapter 212 of FIG. 2. A memory may be, for example, main memory 208, read only memory 224, or a cache such as found in north bridge and memory controller hub 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

The present invention provides an apparatus and a computer implemented method for processing data in a bus system component. The bus system component is configured to operate in one of a PCI Express endpoint mode or a PCI Express root complex mode. Responsive to configuring the bus system component to operate in endpoint mode, the data is processed through the bus system component according to an endpoint process. Responsive to configuring the bus system component to operate in root complex mode, the data is transferred through the bus system component according to a root complex mode. In an illustrative example, the bus system component is a peripheral control interconnect express component. Thus, the PCI Express component of the present invention allows a PCI Express bus component to operate as both a PCI Express root complex and as a PCI Express endpoint.

Figure 3:
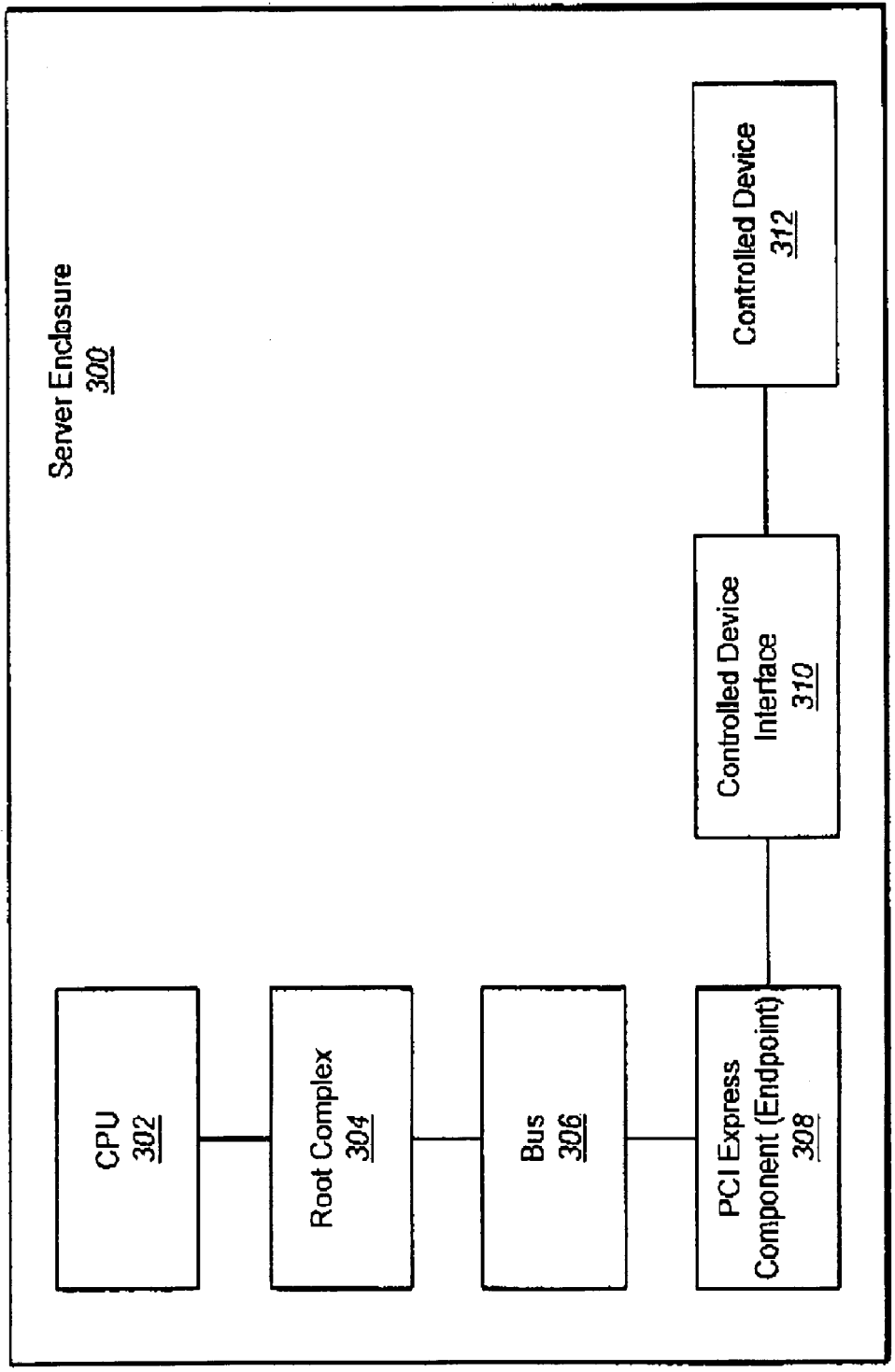
FIG. 3 is a block diagram showing the operation of a bus system in a data processing system, in accordance with an illustrative example of the present invention.

FIG. 3 is a block diagram showing the operation of a bus system in a data processing system, in accordance with an illustrative example of the present invention. The various components shown in FIG. 3 can be contained in server enclosure 300. In this case, server enclosure 300 can be, for example, data processing system 200 shown in FIG. 2. Server enclosure 300 may contain additional components other than those shown in FIG. 3. In the illustrative example shown in FIG. 3, PCI Express component 308 is an application specific integrated circuit that may also include additional hardware or software adapted to control controlled device 312. In the configuration shown in FIG. 3, PCI Express component 308 is a PCI Express component implemented in an endpoint implementation, as opposed to a PCI Express component implemented in a root complex implementation shown in FIG. 4. PCI Express component 308 operates in endpoint mode in order to satisfy the PCI Express specification requirements for the configuration shown in FIG. 3.

Server enclosure 300 includes central processing unit (CPU) 302, which may be any processor that acts as the central processing unit for a data processing system. Central processing unit 302 is connected to root complex 304. Root complex 305 is the bridge between a PCI Express bus 306 and central processing unit 302. Bus 306 routes data from root complex 304 to PCI Express endpoint component 308. PCI Express component 308 can be any application specific integrated circuit designed to operate in PCI Express endpoint mode, though is typically implemented with a controller adapted to control controlled device 312. Data or commands from PCI Express component 308 are routed through controlled device interface 310 to controlled device 312. Likewise, data or commands from controlled device 312 may be routed in reverse, through controlled device interface 310, PCI Express component 308, bus 306, and root complex 304 to central processing unit 302.

In an illustrative example, controlled device 312 is one or more hard disk drives associated with server enclosure 300. Thus, in this example, controlled device 312 may be referred to as hard disk drives 312. PCI Express component 308 is one or more serial attached small computer system interconnect controllers, implemented as an application specific integrated circuit, plus hardware or software adapted for controlling hard disk drives 312. Thus, in this example, PCI Express component 308 may be referred to as disk controller 308. Controlled device interface 310 is the interface between disk controller 308 and hard disk drives 312. In addition, root complex 304 is a PCI Express root complex and bus 306 is a PCI Express bus. Although the illustrative example uses hard disks, controlled device 312 can be a wide variety of devices, such as video cards, mice, monitors, cameras, or any other device. In each of these cases, an appropriate device controller is provided, which is part of PCI Express component 308.

In the illustrative example, FIG. 3 illustrates an endpoint implementation for a PCI Express bus system represented by components 304 through 310. The PCI Express bus system is designed for a serial attached small computer system interconnect (SAS) controller. Disk controller 308 is configured through software running on central processing unit 302 using PCI Express configuration read/write cycles from root complex 304. Using configuration cycles, controller options can be programmed and memory windows into disk controller 308 can be established. After proper configuration, disk controller 308 can begin transferring data between central processing unit 302 and hard disk drives 312.

In addition, disk controller 308 receives its bus/device number assignments through PCI Express configuration write cycles from root complex 304. The bus/device number assignment is a unique identification required by each device in the PCI Express hierarchy. Data packets transferred on PCI Express bus 306 contain a requester identification and a completer identification that facilitate packet routing through the hierarchy. When PCI Express bus 306 initializes, disk controller 308 behaves as an upstream port in PCI Express specification-defined initialization and training sequences. The PCI Express specification is a set of standardized requirements that all PCI Express devices satisfy. Upstream and downstream ports each have unique requirements vis-à-vis initializing and training PCI Express bus 306.

Continuing the illustrative example, disk controller 308 receives PCI Express messages defined in the PCI Express specification as those messages targeting endpoint components. For example, a message could be "set_slot_power" in hard disk drives 312. Disk controller 308 also transmits PCI Express messages defined in the PCI Express specification as targeting root complex 304. Examples of such transmitted PCI Express message include interrupt commands and error messages. For both transmitted and received messages, messages are packets used in a PCI Express hierarchy to replace the sideband signaling required by known bus protocols. The PCI Express specification requirements define each message type and limit the message types that disk controller 308 can transmit and receive.

The PCI Express component of the present invention may be implemented to function in an endpoint implementation, as shown in FIG. 3. In addition, the PCI Express component of the present invention may be implemented to function in a root complex implementation, as shown in FIG. 4.

Figure 4:
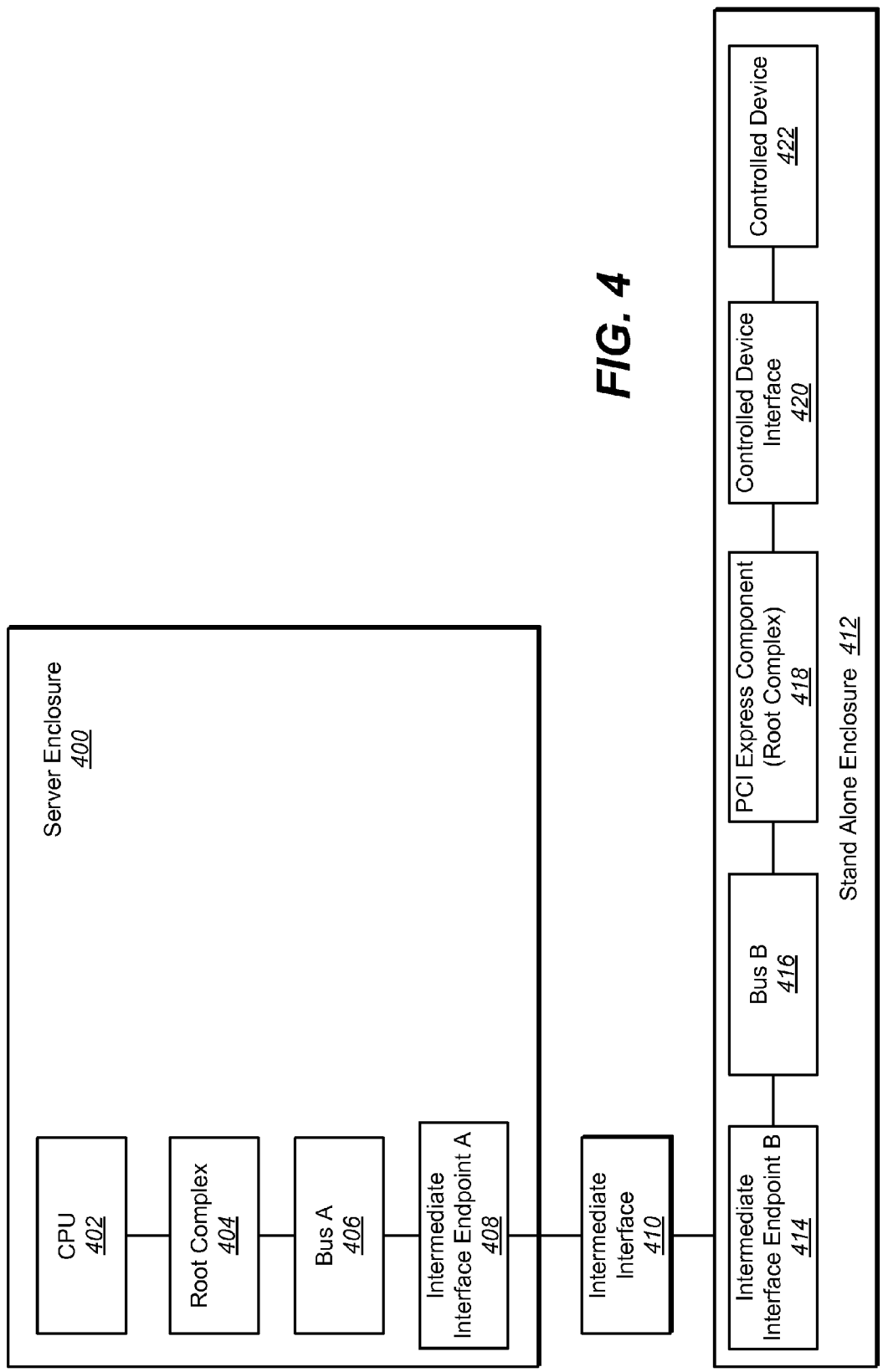
FIG. 4 is a block diagram showing the operation of a bus system in a data processing system, in accordance with an illustrative example of the present invention.

FIG. 4 is a block diagram showing the operation of a bus system in a data processing system, in accordance with an illustrative example of the present invention. Server enclosure 400 includes central processing unit (CPU) 402; however, in this case, controlled device 422 is contained in stand alone enclosure 412. Like server enclosure 300, server enclosure 400 can be, for example, data processing system 200 shown in FIG. 2. Server enclosure 400 may contain additional components other than those shown in FIG. 4. In the illustrative example shown in FIG. 4, PCI Express component 418 is an application specific integrated circuit. The configuration shown in FIG. 4 is a PCI Express component 418 implemented in a root complex implementation, as opposed to a PCI Express component 308 implemented in endpoint implementation shown in FIG. 3. Because PCI Express component 418 is in stand alone enclosure 412, an interface system is needed between server enclosure 400 and stand alone enclosure 412. Thus, in the implementation shown in FIG. 4, PCI Express component 418 is a root complex in order to satisfy the PCI Express specification requirements.

Server enclosure 400 includes central processing unit (CPU) 402, which may be any processor that acts as the central processing unit for a data processing system. Central processing unit 402 is connected to root complex 404. Root complex 404 is the bridge between bus A 406 and central processing unit 402. Server enclosure 400 includes intermediate interface endpoint A 408. In the illustrative example, bus A 406 routes data from root complex 404 to intermediate interface endpoint A 408. Intermediate interface endpoint A 408 is hardware and/or software adapted to facilitate communication between bus A 406 and intermediate interface 410. Intermediate interface 410 is software and/or hardware that allows data to be transferred between server enclosure 400 and stand alone enclosure 412. For example, intermediate interface 410 may be an Ethernet connection, optical fiber, the Internet, or any other connection or interface. Intermediate interface 410 also connects to intermediate interface endpoint B 414. Intermediate interface endpoint B 414 is hardware and/or software adapted to facilitate communication between intermediate interface 410 and bus B 416.

In turn, bus B 416 is connected to PCI Express component 418, which includes hardware or software for controlling controlled device 422. Because server enclosure 400 and stand alone enclosure 412 are logically or physically separated, PCI Express component 418 is implemented in root complex mode and not implemented in endpoint mode, as is PCI Express component 308 in FIG. 3. Data or commands from PCI Express component 418 are routed through controlled device interface 420 to controlled device 422. Likewise, data or commands from controlled device 422 may be routed in reverse, through controlled device interface 420, PCI Express component 418, bus B 416, intermediate interface endpoint B 414, intermediate interface 410, intermediate interface endpoint A 408, bus A 406, and root complex 404 to central processing unit 402.

In an illustrative example, controlled device 422 is one or more hard disk drives associated with stand alone enclosure 412. Thus, in this example, controlled device 422 may be referred to as hard disk drives 422. PCI Express component 418 is an application specific integrated circuit that behaves as a root complex. PCI Express component 418 also includes hardware or software for controlling hard disk drives 422. Thus, in this example, PCI Express component 418 may be referred to as disk controller 418. Controlled device interface 420 is the interface between disk controller 418 and hard disk drives 422. In addition, the other components shown in FIG. 4 are adapted for use with a PCI Express bus system. Although the illustrative example uses hard disks drives, controlled device 422 can be a wide variety of devices, such as video cards, mice, monitors, cameras, or any other device. In each of these cases, an appropriate controller is provided, which is part of PCI Express component 418.

In the illustrative example, FIG. 4 illustrates a root complex implementation for a PCI Express component 418. The bus system is designed for a serial attached small computer system interconnect (SAS) controller. In the root complex implementation shown in FIG. 4, two PCI Express bus hierarchies are separated by intermediate interface 410. Central processing unit 402 resides on one PCI Express hierarchy and communicates with disk controller 418, which resides on a second PCI Express hierarchy. Thus, central processing unit 402 communicates with disk controller 418 via intermediate interface 410. In this configuration, both ends of the intermediate bus can be PCI Express endpoints because disk controller 418 functions as a root complex and configures intermediate interface endpoint B 414, while CPU 402 configures intermediate interface endpoint A 408 through root complex 404.

Because disk controller 418 functions in root complex mode, disk controller 418 can use firmware running on its internal input/output processor to configure intermediate interface endpoint B 414 via PCI Express configuration cycles. In addition, disk controller 418 receives bus/device number assignments through an assignment provided by the firmware. Disk controller 418 in this root complex implementation is also responsible for setting the bus/device number of intermediate interface endpoint 414 through configuration write commands. Furthermore, when bus B 416 initializes, disk controller 418 behaves as a "downstream" port in the PCI Express specification-defined initialization and training sequences.

Moreover, disk controller 418 transmits PCI Express messages defined in the PCI Express specification as those messages targeting an endpoint. For example, a PCI Express message could be "set_slot_power" endpoint 414. Disk controller 418 also receives PCI Express messages defined in the PCI Express specification as targeting root complex 404. Examples of such transmitted PCI Express message include interrupt commands and error messages. For both transmitted and received messages, messages are packets used in a PCI Express hierarchy to replace the sideband signaling required by known bus protocols. The PCI Express specification define each message type and limit the message types that disk controller 308 can transmit and receive.

The PCI Express configurations shown in FIG. 3 and FIG. 4 show two different types of PCI Express components, one for each disk controller. In the PCI Express configuration shown in FIG. 3, the PCI Express component functions only as an endpoint. However, in the PCI Express configuration shown in FIG. 4, the PCI Express component functions as a root complex. Both PCI Express components are application specific integration circuits that share many common features, such as the ability to transfer data to and from hard disk drives as shown; however, each PCI Express component differs in their respective responsibilities on the PCI Express bus. By adding some root complex features into what would otherwise be an endpoint application specific integrated circuit, a single device may be produced that can be used both as an endpoint and as a root complex. Thus, the PCI Express component of the present invention may be provided in both PCI Express component 308 in FIG. 3 and in PCI Express component 418 in FIG. 4, even though PCI Express component 308 in FIG. 3 operates in endpoint mode and PCI Express component 418 in FIG. 4 operates in root complex mode.

Figure 5:
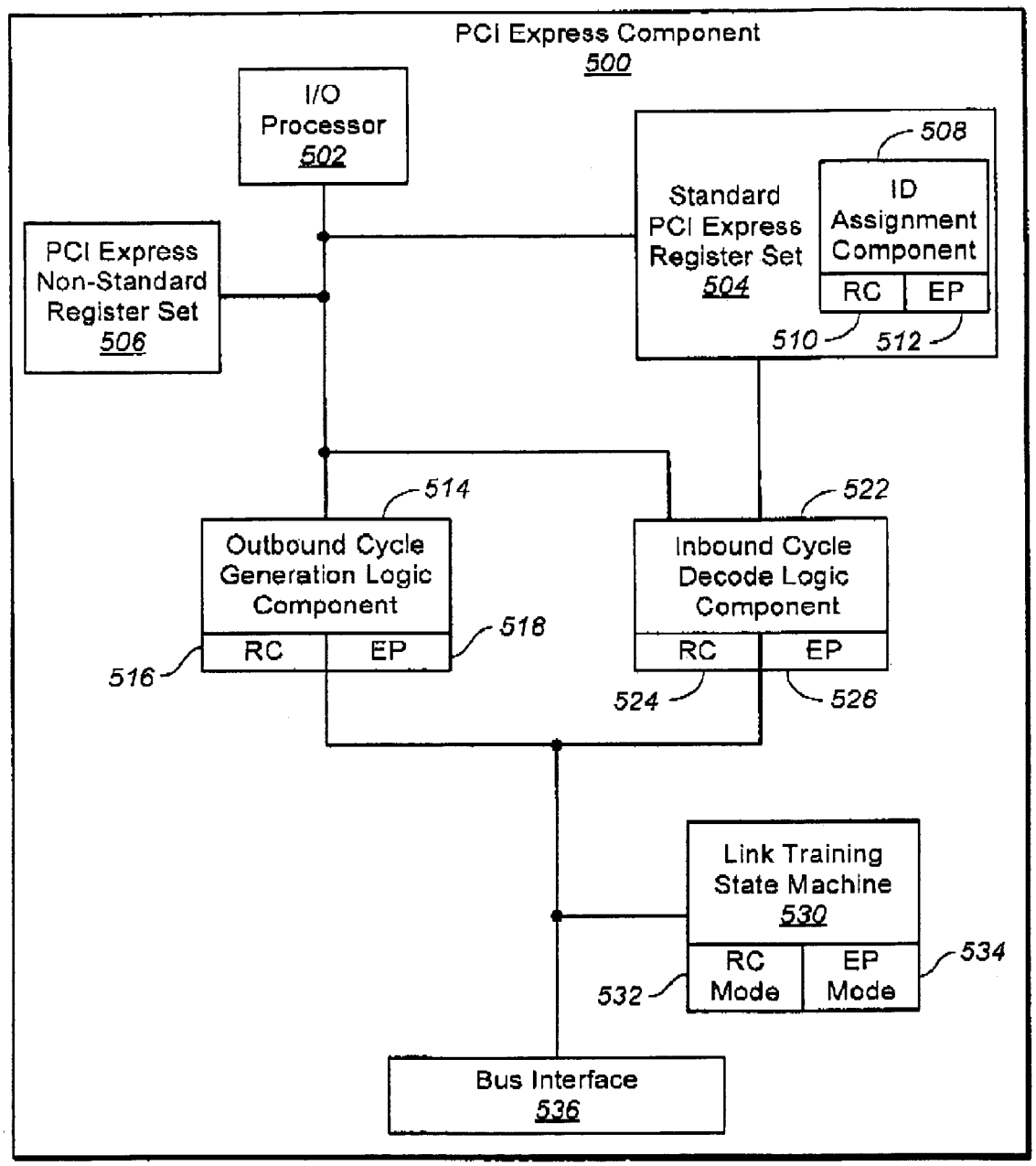
FIG. 5 is a block diagram of a PCI Express component, in accordance with an illustrative example of the present invention.

FIG. 5 is a block diagram of a PCI Express component, in accordance with an illustrative example of the present invention. FIG. 5 shows a PCI Express component that can function both as an endpoint and as a root complex. Characterized differently, PCI Express component 500 may function in either endpoint mode or in root complex mode. PCI Express component 500 is designed to "look like" a PCI Express endpoint from the point of view of the host central processing unit, regardless of which mode PCI Express component 500 is in. As described further below, the PCI Express component 500 ensures that all configuration registers comply with the PCI Express specified endpoint requirements. PCI Express component 500 may be implemented in bus 238 in FIG. 2 or PCI Express component 308 in FIG. 3. In addition, PCI Express component 500 may be implemented in PCI Express component 418 in FIG. 4. Although PCI Express component 500 shown in FIG. 5 is adapted for use as in a PCI Express bus system, the components and principles shown in FIG. 5 may also be used in other bus configurations such that a bus component may operate in both root complex mode and endpoint mode.

PCI Express component 500 includes input/output processor 502, which provides the processing capabilities used to perform the functions of PCI Express component 500. Four other components are connected directly to input/output processor 502, including a standard PCI Express register set 504, non-standard PCI Express register set 506, outbound cycle generation logic component 514, and inbound cycle decode logic component 522. Either standard PCI Express register set 504 or non-standard PCI Express register set 506 may be characterized as a configuration register. Together, outbound cycle generation logic component 514 and inbound cycle decode logic component 522 transmit and receive cycle types on the PCI Express bus. Each of outbound cycle generation logic component 514, inbound cycle decode logic component 522, and link training state machine 530 are connected to bus interface 536.

The PCI Express bus interface 536 connects to a PCI Express root complex or endpoint component attached to the other end of the bus. Whatever device or device interface is connected to bus interface 536, that device or device interface sees PCI Express component 500 as an endpoint. PCI Express component 500 provides whatever root complex capabilities are needed if PCI Express component 500 should operate in root complex mode. Thus, PCI Express component 500 may be used in either PCI Express component 308 in FIG. 3 or PCI Express component 418 in FIG. 4.

The PCI Express specification provides that some bits within registers have different attributes, such as read only, read/write, or other attributes. The PCI Express specification also provides that some bits within registers have different values if the PCI Express device is operating in root complex mode versus endpoint mode. As described above, PCI Express component 500 ensures that all configuration registers comply with the PCI Express specification. Accordingly, PCI Express component 500 includes standard PCI Express register set 504 and non-standard PCI Express register set 506. Standard PCI Express register set 504 contains those registers defined in the PCI Express specification as existing in all PCI Express endpoint components. In turn, non-standard PCI Express register set 506 contains registers required for a particular PCI Express component that are unique to the particular component's specific function and are not specified as standard registers in the PCI Express specification. One of the registers in non-standard register set 506 determines whether PCI Express component 500 operates in endpoint mode or root complex mode.

Mode bits provided by non-standard PCI Express register set 506 identify whether PCI Express component 500 will operate in endpoint or root complex mode. These mode bits can be set by I/O Processor 502 via firmware, or through some external input to PCI Express component 500. These mode bits are fed to the remainder of the elements in PCI Express component 500 to control their behavior. The behavior of the remaining elements is described further below.

Bus/device identification assignment component 508 contains root complex (RC) sub component 510 and endpoint (EP) sub component 512. When in root complex mode, bus/device identification assignments will be provided by firmware through the I/O processor 502 and non-standard PCI Express register set 506. When in endpoint mode, bus/device identification assignments are received through inbound cycle decode logic component 522 as configuration write cycles that are received by PCI Express Component 500.

Outbound cycle generation logic component 514 contains root complex (RC) sub component 516 and endpoint (EP) sub component 518. When in root complex mode, outbound cycle generation logic component 514 will generate cycle types that are permitted by the PCI Express specification as those cycles that can be generated by a root complex. When in endpoint mode, outbound cycle generation logic 514 will generate cycle types that are permitted by the PCI Express specification as those cycles that can be generated by an endpoint.

Inbound cycle decode logic component 522 contains root complex (RC) sub component 524 and endpoint (EP) sub component 526. When in root complex mode, inbound cycle decode logic component 522 will receive and decode cycle types that are permitted by the PCI Express specification as those cycles that can be received by a root complex. When in endpoint mode, inbound cycle decode logic component 522 will receive and decode cycle types that are permitted by the PCI Express specification as those cycles that can be received by an endpoint.

In addition, link training state machine 530 is provided to control the initialization sequence that occurs on the PCI Express bus prior to cycle communications between devices on the bus. Link training state machine 530 contains root complex (RC) sub component 532 and endpoint (EP) sub component 534. When in root complex mode, link training state machine 530 will control the behavior of PCI Express component 500 during bus initialization so that PCI Express component 500 complies with the requirements in the PCI Express specification pertaining to root complex (or downstream port) behavior during bus initialization. When in endpoint mode, link training state machine 530 will control the behavior of the PCI Express component 500 during bus initialization so that PCI Express component 500 complies with the requirements in the PCI Express specification pertaining to endpoint (or upstream port) behavior during bus initialization.

In addition to the above functions, non-standard register set 506 allow PCI Express component 500 to perform functions normally available only in a root complex. Examples of these functions include generating PCI Express configuration read and write cycles, generating PCI Express input/output read and write cycles, receiving PCI Express messages normally received by root complexes and subsequently providing a mechanism to notify input/output processor 502 of the message received, providing a mechanism that allows input/output processor 502 to program bus/device numbers that the device will use in PCI Express requestor and completer identifications, providing a mechanism to notify input/output processor 502 of an unsupported request completion status received for any input/output processor 502 generated configuration read files (this capability allows firmware the capability of searching for devices in the PCI Express hierarchy), providing a mechanism for input/output processor 502 to generate PCI Express messages normally transmitted by root complexes, and providing an input to the PCI Express data link layer that identifies whether an endpoint is in root complex mode or endpoint mode. In the later case, the bus initialization/training behavior of the data link layer is modified to meet PCI Express specification requirements for upstream (endpoint) and downstream (root complex) ports, depending on the mode selected.

In the preceding example, the PCI Express component in FIG. 5 is a bus system component for use in a data processing system. The bus system component includes an input/output processor and a bus/device identification assignment component connected to the input/output processor. The bus/device identification component is adapted to determine a mode used to assign PCI Express defined bus/device assignments. The process component is adapted to process the data according one of the root complex mode and the endpoint mode. The bus system component also includes a bus interface connected to the process component, wherein the bus interface is adapted to transfer the data to and from a destination.

In addition, when PCI Express component 500 operates in endpoint mode, PCI Express component 500 meets the requirements outlined in the PCI Express specification for an endpoint. Thus, during PCI Express bus initialization, PCI Express component 500 will operate according to the endpoint requirements as defined by the PCI Express specification. In addition, PCI Express component 500 will receive and generate cycles according to endpoint device requirements. Endpoints have a different set of cycle types that they can generate and receive than do root complexes. For example, in endpoint mode, PCI Express component 500 will not generate PCI Express configuration read or write commands or I/O read and write commands. Cycles of this type are only received by endpoints according to the PCI Express specification; cycles of this type can not be generated. In addition, the message cycles PCI Express component 500 receives are only those cycle types expected by endpoints, and the message cycles that PCI Express component 500 generates are only the messages associated in the specification as types that an endpoint can generate.

Furthermore, each PCI Express hierarchy requires that bus and device number assignments (specific registers defined in the PCI Express specification that are used as cycle source identifiers) are made by the host CPU through the root complex. Because PCI Express component 500 is always an endpoint, PCI Express component 500 will always latch its bus/device number identifiers through the mechanism defined for endpoints in that specification.

In addition, PCI Express component 500 may operate in root complex mode. When implemented in root complex mode, PCI Express component 500 will instead operate according to the root complex requirements as defined by the PCI Express specification. Thus, PCI Express component 500 will receive and generate cycles according to root complex device requirements. For example, PCI Express component 500 can generate PCI Express configuration read or write commands or I/O read and write commands. In addition, the message cycles PCI Express component 500 receives are only those cycle types expected by root complexes, and the message cycles that PCI Express component 500 generates are only the messages associated in the PCI Express specification as types that a root complex can generate.

Furthermore, each PCI Express hierarchy requires that bus and device number assignments (specific registers defined in the PCI Express specification that are used as cycle source identifiers) are made by the host CPU through the root complex. PCI Express component 500 will assign its own bus/device number identification through firmware for a bus, such as bus 416 in FIG. 4. In addition, firmware in PCI Express component 500 is responsible for assigning bus/device number values for any other device connected to the bus.

Figure 6:
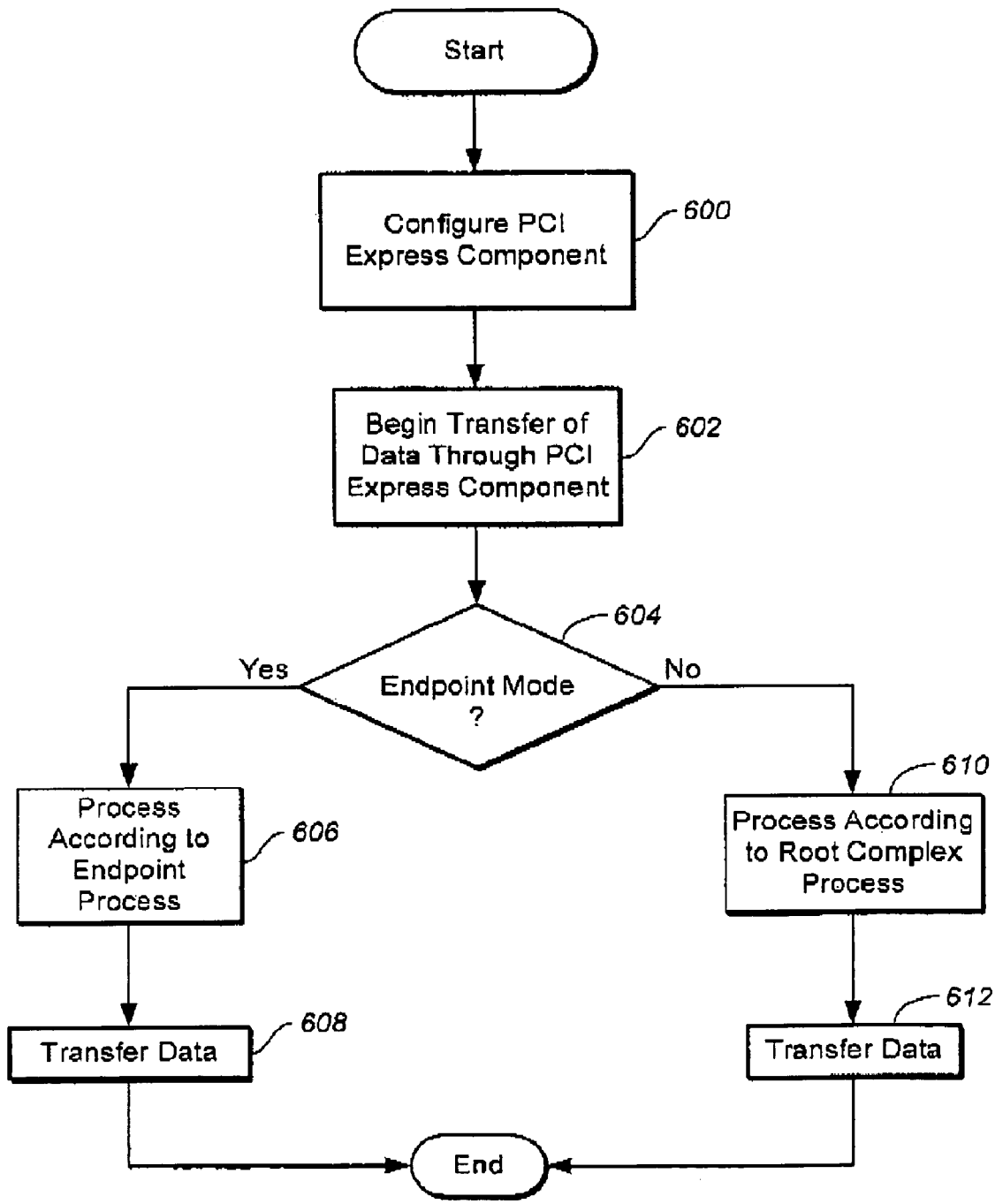
FIG. 6 is a flow chart illustrating processing of data through a PCI Express component capable of operating in multiple modes, in accordance with an illustrative example of the present invention.

FIG. 6 is a flow chart illustrating processing of data through a PCI Express component capable of operating in multiple modes, in accordance with an illustrative example of the present invention. The method shown in FIG. 6 may be implemented in PCI Express component 500 shown in FIG. 5. Depending on which mode of operation is selected, the method shown in FIG. 6 may also be implemented in the configurations shown in FIG. 3 and FIG. 4.

Initially, the PCI Express component is configured to operate in either endpoint mode or root complex mode (step 600), as described with respect to FIG. 5. Next, data routed through the PCI Express bus system is received in the PCI Express component, and transfer of data begins through the PCI Express component (step 602). A determination is then made whether the PCI Express component is configured in endpoint mode or in root complex mode (step 604).

If the PCI Express component is configured to operate in endpoint mode, then the data is processed according to an endpoint process (step 606). Examples of processing data according to an endpoint process are provided in FIG. 3 and in FIG. 5. The data are then transferred to a destination (step 608). The destination can be a central processing unit, a root complex, a device interface, a device, or other component, as described with respect to FIG. 3 and FIG. 5. The process terminates thereafter.

Returning to step 604, if the PCI Express component is not configured to operate in endpoint mode, then the PCI Express component is configured to operate in root complex mode. In this case, the data are processed according to a root complex process (step 610). Examples of processing data according to a root complex process are provided in FIG. 4 and FIG. 5. The data are then transferred to a destination (step 612). The destination can be a can be a central processing unit, root complex, a device interface, a device, or other component, as described with respect to FIG. 4 and FIG. 5. The process terminates thereafter.

The PCI Express component described herein has several advantages over known PCI Express components. No known PCI Express component is capable of operating in both endpoint mode and root complex mode. The PCI Express component of the present invention may operate in both endpoint mode and root complex mode. Thus, the PCI Express component of the present invention provides several advantages over known PCI Express components. Only one application specific integrated circuit need be designed for a PCI Express device controller to operate in both modes. Thus, the development costs associated with developing, deploying, and supporting a PCI Express component are reduced via the PCI Express component of the present invention. Furthermore, if a user desires to reconfigure an existing data processing system from endpoint mode to root complex mode, or visa versa, then no additional parts are required if the PCI Express component of the present invention is used. A customer need only purchase one PCI Express component for use with any given controller or other device. Accordingly, the PCI Express component of the present invention also saves the consumer or user time, effort, and expense.

The PCI Express component of the present invention has been described in the context of a PCI Express bus system, and in particular in the context of communicating with hard disk drive devices. However, the present invention may be used with any bus system that can operate in root complex mode or in endpoint mode. In addition, the PCI Express component of the present invention may be used to communicate with any peripheral device or, in conjunction with appropriate controllers, control any peripheral device in a data processing system. Peripheral devices include video cards, mice, cameras, or any other device that can be connected to a bus port.

The invention can take the form of an entirely hardware embodiment, an entirely software embodiment or an embodiment containing both hardware and software elements. In a preferred embodiment, the invention is implemented in hardware.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method of processing data in a bus system~the computer-implemented method comprising: configuring a bus system component to operate in an endpoint mode in a first bus system, wherein the bus system component is not multi-ported; responsive to configuring the bus system component to operate in the endpoint mode, transferring data through the bus system component according to the endpoint mode; configuring the bus system component to operate in a root complex mode in a second bus system, wherein the bus system component is not dynamically configured; and responsive to configuring the bus system component to operate in the root complex mode in the second bus system, transferring the data through the bus system component according to the root complex mode, and wherein the bus system component further comprises an outbound cycle generation logic component and an inbound cycle decode logic component, wherein the outbound cycle generation logic component generates cycle types according to either the endpoint mode or the root complex mode configured for the bus system component, and wherein the inbound cycle decode logic component receives and decodes the cycle types according to either the endpoint or the root complex configured for the bus system component.

2. The computer-implemented method of claim 1 wherein the bus system component is a peripheral control interconnect express component.

3. The computer-implemented method of claim 1, wherein the bus system is further adapted to control a device.

4. The computer-implemented method of claim 3 further comprising transferring the data to the device.

5. The computer-implemented method of claim 3 wherein the device is a hard disk drive and the bus system component includes a hard disk drive controller.

6. The computer-implemented method of claim 5 wherein the bus system component is a peripheral control interconnect express component.

7. A bus system component for use in a data processing system, said bus system component comprising:
   an input/output processor;
   a non-standard register set component connected to the input/output processor, wherein the non-standard register set component is adapted to determine a mode used to process data flowing through the bus system component, wherein the mode is selected from the group consisting of an endpoint mode and a root complex mode, wherein the bus system component is single-ported;
   a process component connected to the non-standard register set component, wherein the process component is adapted to process the data according to the endpoint mode in a first bus system and the root complex mode in a second bus system, wherein the bus system component is not dynamically configured; and
   a bus interface connected to the process component, wherein the bus interface is adapted to transfer the data to a destination, wherein the data is transferred according to the endpoint mode in the first bus system and wherein the data is transferred according to the root complex mode in the second bus system, and wherein the bus system component further comprises an outbound cycle generation logic component and an inbound cycle decode logic component, wherein the outbound cycle generation logic component generates cycle types according to either the endpoint mode or the root complex mode configured for the bus system component, and wherein the inbound cycle decode logic component receives and decodes the cycle types according to either the endpoint or the root complex configured for the bus system component.

8. The bus system component of claim 7 wherein the bus system component is a peripheral control interconnect express component, wherein the peripheral control interconnect express component includes a configuration register.

9. The bus system component of claim 8 wherein the configuration register is selected from a group consisting of a peripheral control interconnect interface express standard configuration register and a peripheral control interconnect interface express non-standard configuration register.

10. The bus system component of claim 7 wherein the process component further comprises:
    the outbound cycle generation logic component connected to the non-standard register set component; and
    the inbound cycle decode logic component connected to the non-standard register set component.

11. The bus system component of claim 10 wherein the outbound cycle generation logic component further comprises a first root complex process sub component and a first endpoint process sub component.

12. The bus system component of claim 10 wherein the inbound cycle decode logic component further comprises a second root complex process sub component and a second endpoint process sub component.

13. The bus system component of claim 11 wherein the inbound cycle decode logic component further comprises a second root complex process sub component and a second endpoint process sub component.

14. The bus system component of claim 10 further comprising:
    a link training state machine connected to the outbound cycle generation logic component, the inbound cycle decode logic component, and the bus interface.

15. The bus system component of claim 14, wherein the link training state machine is adapted to operate in either a root complex mode or the endpoint mode.

16. The bus system component of claim 15 wherein the bus system component is a peripheral control interconnect express component.

* * * * *